United States Patent
He et al.

(10) Patent No.: US 12,363,797 B2
(45) Date of Patent: Jul. 15, 2025

(54) METHODS, APPARATUSES, AND COMPUTER READABLE MEDIA FOR ADJUSTING COVERAGE OF MULTIMEDIA BROADCAST MULTICAST SERVICE

(71) Applicant: Nokia Technologies Oy, Espoo (FI)

(72) Inventors: Jing He, Beijing (CN); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 17/788,478

(22) PCT Filed: Jul. 31, 2020

(86) PCT No.: PCT/CN2020/106246
§ 371 (c)(1),
(2) Date: Jun. 23, 2022

(87) PCT Pub. No.: WO2022/021339
PCT Pub. Date: Feb. 3, 2022

(65) Prior Publication Data
US 2023/0025862 A1  Jan. 26, 2023

(51) Int. Cl.
*H04W 76/40* (2018.01)
*H04L 1/00* (2006.01)
(Continued)

(52) U.S. Cl.
CPC .......... *H04W 76/40* (2018.02); *H04L 1/0003* (2013.01); *H04L 1/0009* (2013.01); *H04L 1/188* (2013.01); *H04W 52/143* (2013.01)

(58) Field of Classification Search
CPC ...... H04W 76/40; H04W 52/143; H04L 1/188
See application file for complete search history.

(56) References Cited

U.S. PATENT DOCUMENTS

| | | | |
|---|---|---|---|
| 9,253,671 B2 | 2/2016 | Jung et al. | |
| 9,713,048 B2 | 7/2017 | Jung et al. | |
| (Continued) | | | |

FOREIGN PATENT DOCUMENTS

| | | |
|---|---|---|
| CN | 101160982 A | 4/2008 |
| CN | 102047699 A | 5/2011 |
| (Continued) | | |

OTHER PUBLICATIONS

Extended European Search Report received for corresponding European Patent Application No. 20947758.7, dated Nov. 16, 2022, 8 pages.
(Continued)

*Primary Examiner* — Charles C Jiang
*Assistant Examiner* — Margaret Marie Anderson
(74) *Attorney, Agent, or Firm* — Lippes Mathias LLP

(57) ABSTRACT

Disclosed are methods for adjusting cell coverage of a multimedia broadcast multicast service. An example method (700) may include transmitting (701) data of a multimedia broadcast multicast service on a point-to-multipoint channel, monitoring (702) an uplink channel for information on an abnormal reception of the data, and adjusting (703) coverage of the point-to-multipoint channel based on the monitoring. Related apparatuses and computer readable media are also disclosed.

2 Claims, 8 Drawing Sheets

(51) Int. Cl.
  *H04L 1/1867* (2023.01)
  *H04W 52/14* (2009.01)

(56) References Cited

U.S. PATENT DOCUMENTS

| | | | |
|---|---|---|---|
| 9,866,919 | B2 | 1/2018 | Godor et al. |
| 10,015,765 | B2 | 7/2018 | Lee et al. |
| 2005/0169202 | A1* | 8/2005 | Ratasuk ............... H04W 52/327 370/312 |
| 2006/0221896 | A1 | 10/2006 | Vaittinen et al. |
| 2008/0247372 | A1 | 10/2008 | Chion et al. |
| 2013/0242716 | A1 | 9/2013 | Amerga et al. |
| 2014/0192728 | A1 | 7/2014 | Vaittinen et al. |
| 2017/0195906 | A1 | 7/2017 | Dalsgaard et al. |
| 2019/0037592 | A1 | 1/2019 | Jung et al. |
| 2019/0222967 | A1 | 7/2019 | Ratilainen et al. |
| 2019/0335532 | A1 | 10/2019 | Kim et al. |
| 2020/0204329 | A1* | 6/2020 | Fujishiro ............... H04L 1/1861 |

FOREIGN PATENT DOCUMENTS

| | | |
|---|---|---|
| CN | 102170610 A | 8/2011 |
| WO | 2017/138796 A1 | 8/2017 |
| WO | 2018/117774 A1 | 6/2018 |

OTHER PUBLICATIONS

"Feedback Control for MBMS in E-Utra", 3GPP TSG RAN WG1 Meeting #49bis, R1-072954, Agenda: 5.13.2, NTT DoCoMo, Jun. 25-29, 2007, pp. 1-3.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"New Work Item on NR support of Multicast and Broadcast Services", 3GPP TSG RAN Meeting #86, RP-193248, Agenda: 9.1.2, Huawei, Dec. 9-12, 2019, 5 pages.

"3rd Generation Partnership Project; Technical Specification Group Radio Access Network; Evolved Universal Terrestrial Radio Access (E-UTRA); Study on single-cell point-to-multipoint transmission for E-UTRA (Release 13)", 3GPP TR 36.890, V13.0.0, Jun. 2015, pp. 1-31.

"3rd Generation Partnership Project; Technical Specification Group Services and System Aspects; Multimedia Broadcast/Multicast Service (MBMS); Protocols and codecs (Release 16)", 3GPP TS 26.346, V16.4.1, Mar. 2020, pp. 1-262.

Tesema et al., "Layer 2 FEC in 5G Broadcast/Multicast Networks", Nomor Research GmbH, Novel Mobile Radio, Aug. 29, 2018, pp. 1-26.

"Guidelines for evaluation of radio interface technologies for IMT-2020", M Series Mobile, radiodetermination, amateur and related satellite services, Report ITU-R M.2412-0, Oct. 2017, 144 pages.

"3rd Generation Partnership Project; Technical Specification Group Radio Access Network; Study on channel model for frequencies from 0.5 to 100 GHz (Release 16)", 3GPP TR 38.901, V16.0.0, Oct. 2019, pp. 1-101.

"Link Adaptation and Reception of SC-PTM in RRC_IDLE", 3GPP TSG-RAN WG2 Meeting #90, R2-152580, Agenda: 7.3.2, Nokia Networks, May 25-29, 2015, 4 pages.

"Mechanisms to enable simultaneous operation of NR Unicast + LTE MBMS", 3GPP TSG RAN WG2 #110e, R2-2004535, Agenda: 6.20.1.2, Qualcomm Incorporated, Jun. 1-12, 2020, pp. 1-5.

Bejerano et al., "DyMo: Dynamic monitoring of large scale LTE-Multicast systems", IEEE Conference on Computer Communications, May 1-4, 2017, 9 pages.

International Search Report and Written Opinion received for corresponding Patent Cooperation Treaty Application No. PCT/CN2020/106246, dated May 7, 2021, 10 pages.

Office action received for corresponding Chinese Patent Application No. 202080098154.2, dated Apr. 9, 2024, 11 pages of office action and no page of translation available.

Office action received for corresponding Chinese Patent Application No. 202080098154.2, dated Aug. 27, 2024, 11 pages of office action and no page of translation available.

* cited by examiner

METHODS, APPARATUSES, AND COMPUTER READABLE MEDIA FOR ADJUSTING COVERAGE OF MULTIMEDIA BROADCAST MULTICAST SERVICE

RELATED APPLICATION

This application was originally filed as PCT Application No. PCT/CN2020/106246 on Jul. 31, 2020, each of which is incorporated herein by reference in its entirety.

TECHNICAL FIELD

Various embodiments relate to methods, apparatuses, and computer readable media for adjusting coverage of a multimedia broadcast multicast service (MBMS).

BACKGROUND

MBMS may be supported in a telecommunication system such as a long term evolution (LTE) system, new radio (NR or 5G) system, or the like.

SUMMARY

In a first aspect, disclosed is a method including transmitting data of a multimedia broadcast multicast service on a point-to-multipoint channel, monitoring an uplink channel for information on an abnormal reception of the data, and adjusting coverage of the point-to-multipoint channel based on the monitoring. For example, this method may be performed in a base station.

In some embodiments, the method may further include starting a timer in response to the transmission of the data of the multimedia broadcast multicast service on the point-to-multipoint channel, and stopping the timer in response to a reception of the information on the abnormal reception on the uplink channel before an expiration of the timer.

In some embodiments, the coverage of the point-to-multipoint channel may be reduced in response to the expiration of the timer, and/or the coverage of the point-to-multipoint channel may be enlarged based on the information on the abnormal reception received before stopping the timer.

In some embodiments, the adjustment of the coverage of the point-to-multipoint channel may include at least one of: reducing the coverage of the point-to-multipoint channel by at least one of a reduction of transmission power of the point-to-multipoint channel or an improvement of modulation and coding scheme level of the point-to-multipoint channel; or enlarging the coverage of the point-to-multipoint channel by at least one of an improvement of the transmission power of the point-to-multipoint channel or a reduction of modulation and the coding scheme level of the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be received via at least one of: a radio resource control signaling, a media access control control element, a physical signaling, a preamble, or the like.

In some embodiments, the method may further include transmitting information on at least one of: a configuration of the information on the abnormal reception, information on a timer for monitoring the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service on the point-to-multipoint channel may include at least one of: a control signaling of the multimedia broadcast multicast service on a multicast control channel, service data of the multimedia broadcast multicast service on a multicast traffic channel, or the like.

In some embodiments, the transmission of the data of the multimedia broadcast multicast service, the transmission of the information on the configuration of the information on the abnormal reception and so on, and a reception of the information on the abnormal reception may be associated with different serving cells.

In a second aspect, disclosed is an apparatus which may be configured to perform at least the method in the first aspect. The apparatus may include at least one processor and at least one memory. The at least one memory may include computer program code, and the at least one memory and the computer program code may be configured to, with the at least one processor, cause the apparatus to perform transmitting data of a multimedia broadcast multicast service on a point-to-multipoint channel, monitoring an uplink channel for information on an abnormal reception of the data, and adjusting coverage of the point-to-multipoint channel based on the monitoring. For example, this apparatus may be at least a part of a base station.

In some embodiments, the at least one memory and the computer program code may be further configured to, with the at least one processor, cause the apparatus to perform starting a timer in response to the transmission of the data of the multimedia broadcast multicast service on the point-to-multipoint channel, and stopping the timer in response to a reception of the information on the abnormal reception on the uplink channel before an expiration of the timer.

In some embodiments, the coverage of the point-to-multipoint channel may be reduced in response to the expiration of the timer, and/or the coverage of the point-to-multipoint channel may be enlarged based on the information on the abnormal reception received before stopping the timer.

In some embodiments, the adjustment of the coverage of the point-to-multipoint channel may include at least one of: reducing the coverage of the point-to-multipoint channel by at least one of a reduction of transmission power of the point-to-multipoint channel or an improvement of modulation and coding scheme level of the point-to-multipoint channel; or enlarging the coverage of the point-to-multipoint channel by at least one of an improvement of the transmission power of the point-to-multipoint channel or a reduction of modulation and the coding scheme level of the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be received via at least one of: a radio resource control signaling, a media access control control element, a physical signaling, a preamble, or the like.

In some embodiments, the at least one memory and the computer program code may be further configured to, with the at least one processor, cause the apparatus to perform transmitting information on at least one of: a configuration of the information on the abnormal reception, information on a timer for monitoring the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service on the point-to-multipoint channel may include at least one of: a control signaling of the multimedia broadcast multicast service on a multicast control channel, service data of the multimedia broadcast multicast service on a multicast traffic channel, or the like.

In some embodiments, the transmission of the data of the multimedia broadcast multicast service, the transmission of the information on the configuration of the information on the abnormal reception and so on, and a reception of the information on the abnormal reception may be associated with different serving cells.

In a third aspect, disclosed is an apparatus which may be configured to perform at least the method in the first aspect. The apparatus may include means for transmitting data of a multimedia broadcast multicast service on a point-to-multipoint channel, means for monitoring an uplink channel for information on an abnormal reception of the data, and means for adjusting coverage of the point-to-multipoint channel based on the monitoring. For example, this apparatus may be at least a part of a base station.

In some embodiments, the apparatus may further include means for starting a timer in response to the transmission of the data of the multimedia broadcast multicast service on the point-to-multipoint channel, and means for stopping the timer in response to a reception of the information on the abnormal reception on the uplink channel before an expiration of the timer.

In some embodiments, the coverage of the point-to-multipoint channel may be reduced in response to the expiration of the timer, and/or the coverage of the point-to-multipoint channel may be enlarged based on the information on the abnormal reception received before stopping the timer.

In some embodiments, the adjustment of the coverage of the point-to-multipoint channel may include at least one of: reducing the coverage of the point-to-multipoint channel by at least one of a reduction of transmission power of the point-to-multipoint channel or an improvement of modulation and coding scheme level of the point-to-multipoint channel; or enlarging the coverage of the point-to-multipoint channel by at least one of an improvement of the transmission power of the point-to-multipoint channel or a reduction of modulation and the coding scheme level of the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be received via at least one of: a radio resource control signaling, a media access control control element, a physical signaling, a preamble, or the like.

In some embodiments, the apparatus may further include means for transmitting information on at least one of: a configuration of the information on the abnormal reception, information on a timer for monitoring the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service on the point-to-multipoint channel may include at least one of: a control signaling of the multimedia broadcast multicast service on a multicast control channel, service data of the multimedia broadcast multicast service on a multicast traffic channel, or the like.

In some embodiments, the transmission of the data of the multimedia broadcast multicast service, the transmission of the information on the configuration of the information on the abnormal reception and so on, and a reception of the information on the abnormal reception may be associated with different serving cells.

In a fourth aspect, a computer readable medium is disclosed. The computer readable medium may include instructions stored thereon for causing an apparatus to perform the method in the first aspect. The instructions may cause the apparatus to perform transmitting data of a multimedia broadcast multicast service on a point-to-multipoint channel, monitoring an uplink channel for information on an abnormal reception of the data, and adjusting coverage of the point-to-multipoint channel based on the monitoring. For example, this apparatus may be at least a part of a base station.

In some embodiments, the instructions may cause the apparatus to further perform starting a timer in response to the transmission of the data of the multimedia broadcast multicast service on the point-to-multipoint channel, and stopping the timer in response to a reception of the information on the abnormal reception on the uplink channel before an expiration of the timer.

In some embodiments, the coverage of the point-to-multipoint channel may be reduced in response to the expiration of the timer, and/or the coverage of the point-to-multipoint channel may be enlarged based on the information on the abnormal reception received before stopping the timer.

In some embodiments, the adjustment of the coverage of the point-to-multipoint channel may include at least one of: reducing the coverage of the point-to-multipoint channel by at least one of a reduction of transmission power of the point-to-multipoint channel or an improvement of modulation and coding scheme level of the point-to-multipoint channel; or enlarging the coverage of the point-to-multipoint channel by at least one of an improvement of the transmission power of the point-to-multipoint channel or a reduction of modulation and the coding scheme level of the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be received via at least one of: a radio resource control signaling, a media access control control element, a physical signaling, a preamble, or the like.

In some embodiments, the instructions may cause the apparatus to further perform transmitting information on at least one of: a configuration of the information on the abnormal reception, information on a timer for monitoring the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service on the point-to-multipoint channel may include at least one of: a control signaling of the multimedia broadcast multicast service on a multicast control channel, service data of the multimedia broadcast multicast service on a multicast traffic channel, or the like.

In some embodiments, the transmission of the data of the multimedia broadcast multicast service, the transmission of the information on the configuration of the information on the abnormal reception and so on, and a reception of the information on the abnormal reception may be associated with different serving cells.

In a fifth aspect, disclosed is a method including monitoring a point-to-multipoint channel for data of a multimedia broadcast multicast service, detecting an abnormal reception of the data, and transmitting information on the abnormal reception in response to the detection. For example, this method may be performed in user equipment.

In some embodiments, the abnormal reception of the data may include at least one of: a reception failure of the data on the point-to-multipoint channel within a predetermined time window, or a decoding error of the data received via the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be transmitted via at least one of: a radio resource control signaling, a media access control control element, a physical layer signaling, a preamble, or the like.

In some embodiments, the method may further include receiving information on at least one of: a configuration of the information on the abnormal reception, information on a timer for transmitting the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service via the point-to-multipoint channel may include at least one of: a control signaling of the multimedia broadcast multicast service via a multicast control channel, service data of the multimedia broadcast multicast service via a multicast traffic channel, or the like.

In some embodiments, a reception of the data of the multimedia broadcast multicast service, the reception of the information on the configuration of the information on the abnormal reception and so on, and the transmission of the information on the abnormal reception may be associated with different serving cells.

In a sixth aspect, disclosed is an apparatus which may be configured to perform at least the method in the fifth aspect. The apparatus may include at least one processor and at least one memory. The at least one memory may include computer program code, and the at least one memory and the computer program code may be configured to, with the at least one processor, cause the apparatus to perform monitoring a point-to-multipoint channel for data of a multimedia broadcast multicast service, detecting an abnormal reception of the data, and transmitting information on the abnormal reception in response to the detection. For example, this apparatus may be at least a part of user equipment.

In some embodiments, the abnormal reception of the data may include at least one of: a reception failure of the data on the point-to-multipoint channel within a predetermined time window, or a decoding error of the data received via the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be transmitted via at least one of: a radio resource control signaling, a media access control control element, a physical layer signaling, a preamble, or the like.

In some embodiments, the at least one memory and the computer program code may be configured to, with the at least one processor, cause the apparatus to further perform receiving information on at least one of: a configuration of the information on the abnormal reception, information on a timer for transmitting the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of: a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service via the point-to-multipoint channel may include at least one of: a control signaling of the multimedia broadcast multicast service via a multicast control channel, service data of the multimedia broadcast multicast service via a multicast traffic channel, or the like.

In some embodiments, a reception of the data of the multimedia broadcast multicast service, the reception of the information on the configuration of the information on the abnormal reception and so on, and the transmission of the information on the abnormal reception may be associated with different serving cells.

In a seventh aspect, disclosed is an apparatus which may be configured to perform at least the method in the fifth aspect. The apparatus may include means for monitoring a point-to-multipoint channel for data of a multimedia broadcast multicast service, means for detecting an abnormal reception of the data, and means for transmitting information on the abnormal reception in response to the detection. For example, this apparatus may be at least a part of user equipment.

In some embodiments, the abnormal reception of the data may include at least one of: a reception failure of the data on the point-to-multipoint channel within a predetermined time window, or a decoding error of the data received via the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be transmitted via at least one of: a radio resource control signaling, a media access control control element, a physical layer signaling, a preamble, or the like.

In some embodiments, the apparatus may further include means for receiving information on at least one of: a configuration of the information on the abnormal reception, information on a timer for transmitting the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service via the point-to-multipoint channel may include at least one of: a control signaling of the multimedia broadcast multicast service via a multicast control channel, service data of the multimedia broadcast multicast service via a multicast traffic channel, or the like.

In some embodiments, a reception of the data of the multimedia broadcast multicast service, the reception of the information on the configuration of the information on the abnormal reception and so on, and the transmission of the information on the abnormal reception may be associated with different serving cells.

In an eighth aspect, a computer readable medium is disclosed. The computer readable medium may include instructions stored thereon for causing an apparatus to perform the method in the fifth aspect. The instructions may cause the apparatus to perform monitoring a point-to-multipoint channel for data of a multimedia broadcast multicast service, detecting an abnormal reception of the data, and transmitting information on the abnormal reception in response to the detection. For example, this apparatus may be at least a part of user equipment.

In some embodiments, the abnormal reception of the data may include at least one of: a reception failure of the data on the point-to-multipoint channel within a predetermined time window, or a decoding error of the data received via the point-to-multipoint channel.

In some embodiments, the information on the abnormal reception may include information on at least one of: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or in the serving cell that provides one or more multimedia broadcast multicast services, at least one multimedia broadcast multicast service of interest in the current cell or in the serving cell that provides one or more multimedia broadcast multicast services, or the like.

In some embodiments, the at least one quality detection on the point-to-multipoint channel associated with the multimedia broadcast multicast service may include at least one of: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, a detected package error rate on the point-to-multipoint channel associated with the multimedia broadcast multicast service, or the like.

In some embodiments, the information on the abnormal reception may be transmitted via at least one of: a radio resource control signaling, a media access control control element, a physical layer signaling, a preamble, or the like.

In some embodiments, the instructions may cause the apparatus to further perform receiving information on at least one of: a configuration of the information on the abnormal reception, information on a timer for transmitting the information on the abnormal reception, at least one ongoing multimedia broadcast multicast service in a current cell or in a serving cell that provides one or more multimedia broadcast multicast services, at least one quality threshold on the point-to-multipoint channel associated with the multimedia broadcast multicast service, or the like, via at least one of a radio resource control signaling, system information, a dedicated signaling, or the like.

In some embodiments, the configuration of the information on the abnormal reception may be associated with the multimedia broadcast multicast service.

In some embodiments, the data of the multimedia broadcast multicast service via the point-to-multipoint channel may include at least one of: a control signaling of the multimedia broadcast multicast service via a multicast control channel, service data of the multimedia broadcast multicast service via a multicast traffic channel, or the like.

In some embodiments, a reception of the data of the multimedia broadcast multicast service, the reception of the information on the configuration of the information on the abnormal reception and so on, and the transmission of the information on the abnormal reception may be associated with different serving cells.

BRIEF DESCRIPTION OF THE DRAWINGS

Some embodiments will now be described, by way of non-limiting examples, with reference to the accompanying drawings.

DETAILED DESCRIPTION

In a case of supporting MBMS in the telecommunication system/network such as the LTE system and the NR system, converge of a point-to-multipoint (P2MP) channel such as a multicast control channel (MCCH) and a multicast traffic channel (MTCH) or coverage of MBMS transmission may be configured statically to match a cell area, to ensure that MBMS transmission via the P2MP channel may reach user equipment (UE) possibly at an edge of the cell area. On the other hand, for example in a case where no UE receiving MBMS is locating at the edge of the cell area, such static configuration for the coverage of the MBMS transmission may result in a waste of transmission power and may increase interference.

Figure 1:
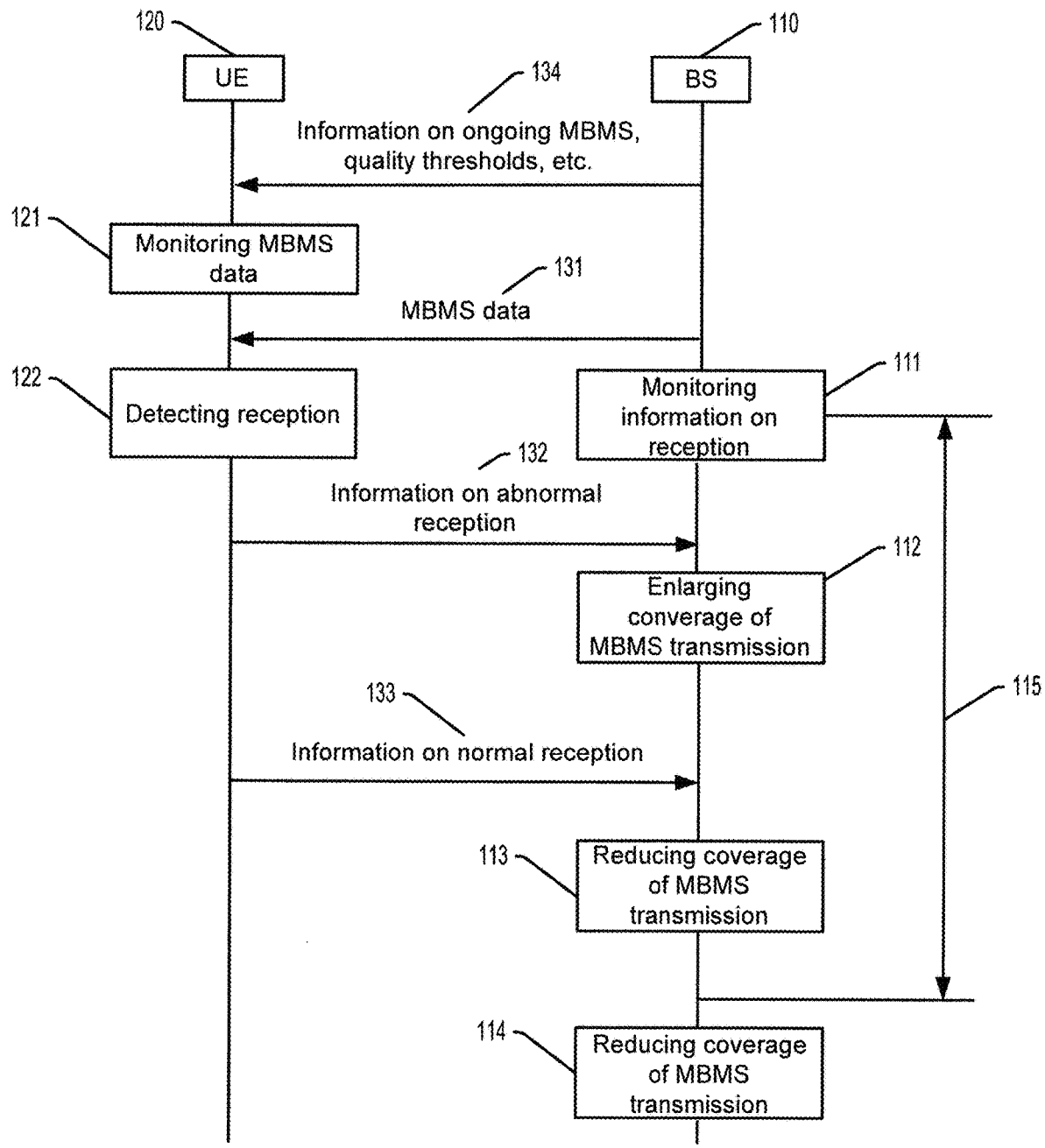
FIG. 1 illustrates an example procedure of configuring/adjusting dynamically coverage of the MBMS transmission in an embodiment.

FIG. 1 illustrates an example procedure of configuring/adjusting dynamically coverage of the MBMS transmission in an embodiment.

In the example as illustrated in FIG. 1, a base station (BS) 110 of the network may transmit MBMS data 131 on at least one P2MP channel to one or more UEs which are monitoring the MBMS data 131. For example, the at least one P2MP may include, but is not limited to, MCCH, MTCH, or the like, and the MBMS data 131 transmitted by the BS 110 on the at least one P2MP channel may include, but is not limited to, control signaling of the MBMS on the MCCH, service data of the MBMS on the MTCH, or the like. Then, in an operation 111, the BS 110 may monitor at least one uplink channel for information on a reception status of the MBMS data 131 from one or more UEs, and may adjust coverage of the MBMS transmission or P2MP channel based on the monitoring result in the operation 111, for example by adjusting at least one of transmission power of the P2MP channel or modulation and coding scheme (MCS) level of the P2MP channel.

Cooperating with the BS 110, as illustrated in FIG. 1, a UE 120 expecting MBMS data from the BS 110 may monitor the MBMS data 131 on at least one P2MP channel in an operation 121, and may further detect a reception status of the MBMS data 131 in an operation 122. For example, in a case where the UE 120 does not receive MBMS data within a predetermined time window, or in a case where the UE 120 suffers an error or an exception when decoding the received MBMS data 131, or in a case where the MBMS data 131 is unexpected by the UE 120, or the like, the UE 120 may detect an abnormal reception of MBMS data in the operation 122, and may transmit information 132 on the abnormal reception of MBMS data via an uplink channel to the BS 110.

In an example, the information 132 may include an indication (e.g. a 1-bit indication) on the abnormal reception of MBMS data. In addition or instead, for example, one or more additional information items may be included in the information 132.

For example, the additional information items in the information 132 may include one or more quality detections on the at least one P2MP channel associated with the MBMS, which may be detected or measured for example in a case where the UE 120 detects an abnormal reception of MBMS data in the operation 122, or during a period when monitoring the MBMS data in the operation 121, or at other suitable timing. For example, the quality detection may include, but is not limited to, one or more of at least one detected signal and noise rate (SNR) on the at least one P2MP channel associated with the MBMS, at least one detected channel quality information (CQI) on the at least one P2MP channel associated with the MBMS, at least one detected block error rate (BLER) on the at least one P2MP channel associated with the MBMS, at least one detected package error rate (PER) on the at least one P2MP channel associated with the MBMS, or the like.

For example, the additional information items in the information 132 may also include information for example on one or more of at least one ongoing MBMS in a current cell or in a serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. For example, the information 132 may include at least one temporary mobile group identity (TMGI) of at least one ongoing MBMS in the current cell or in the serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. For example, in a case where the UE 120 may detect an abnormal reception of MBMS data in the operation 122, the UE 120 may remove information on the MBMS associated with the MBMS data 131 in at least one correctly received MBMS in the current cell or in the serving cell that provides one or more multimedia broadcast multicast services, and the information 132 may include the updated list of the at least one correctly received MBMS in the current cell or in the serving cell that provides one or more multimedia broadcast multicast services.

In various examples, the information 132 on the abnormal reception of MBMS data may be enclosed and transmitted by a radio resource control (RRC) signaling, a media access control (MAC) control element (CE), a physical layer signaling, or the like. For example, in case where the UE 120 is in an idle state (e.g. RRC_IDLE state) or an inactive state (e.g. RRC_INACTIVE state), the UE 120 may request an RRC connection and may enclose the information 132 on the abnormal reception of MBMS data in the message 3 (or msg3) of a random access (RA) procedure or message A (or msgA) of a 2-step RA procedure or the like, through which signaling overhead may be reduced. In another example, a preamble may be configured for the information 132 on the abnormal reception of MBMS data, and the UE 120 may transmit the preamble to the BS 110 when detecting the abnormal reception of MBMS data in the operation 122.

As illustrated in FIG. 1, in a case where the BS 110 receives or detects the information 132 on the abnormal reception of MBMS data from the UE 120, the BS 110 may enlarge the coverage of the P2MP channel or the MBMS transmission in an operation 112, for example by improving the transmission power of the P2MP channel and/or reducing the MCS level of the P2MP channel.

For example, in response to receiving the information 132 or detecting an indication of abnormal reception of MBMS data based on the information 132, the BS 110 may determine the reception status of the MBMS data 131 as an abnormal reception, and may perform the operation 112 to increase the transmission power of the P2MP channel by a predetermined degree and/or reduce MCS level of the P2MP channel by a predetermined number of levels.

In another example, the BS 110 may perform a finer adjustment of the coverage of the MBMS transmission based on one or more additional information items in the information 132. For example, when receiving the information 132, the BS 110 may determine an adjustment amount for the transmission power of the P2MP channel and/or MCS level of the P2MP channel, for which MBMS the adjustment is to be performed, or the like, based on one or more information items in the information 132, such as one or more quality detections, at least one ongoing MBMS in a current cell or in a serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. Then, the BS 110 may increase the transmission power of the P2MP channel and/or reduce MCS level of the P2MP channel based on the determined adjustment amount for the P2MP associated with the determined MBMS. For example, the BS 110 may determine one or more services which belongs to at least one ongoing MBMS in the current cell (or the serving cell providing one or more multimedia broadcast multicast services) or at least one MBMS of interest in the current cell (or the serving cell providing one or more multimedia broadcast multicast services) but are not in at least one correctly received MBMS in the current cell (or the serving cell providing one or more multimedia broadcast multicast services), and increase the transmission power of the P2MP channel associated with determined one or more services and/or reduce MCS level of the P2MP channel associated with determined one or more services, and may retransmit the MBMS data 131 associated with determined one or more services.

For the operation 111 of monitoring the information 132 on abnormal information of MBMS data, a timer may be configured in the BS 110 to provide a monitor time window 115 for the BS 110. For example, the timer may be started or restarted in the BS 110 in response to the transmission of the MBMS data 131 or in parallel to the operation 111 of monitoring the information on the reception status, or the like, and may be stopped in response to detecting or receiving the information 132 on the abnormal reception of the MBMS data from one or more UEs.

Thus, in a case where the BS 110 receives the information 132 on the abnormal reception of MBMS data before an expiration of the timer configured in the BS 110 to provide the monitor time window 115 for the BS 110, the BS 110 may perform the operation 112 to enlarge the coverage of the MBMS transmission. Then, the BS 110 may retransmit the MBMS data 131 on the at least one P2MP channel one or more UEs (e.g. including the UE 120) by the increased transmission power and/or decreased MCS level, and may perform the operation 111 again to monitor the information on the reception status of the MBMS data 131, where, for example, the timer configured in the BS 110 to provide the monitor time window 115 for the BS 110 may be restarted in response to the retransmission of the MBMS data 131 or in parallel to the operation 111.

In a case where the BS 110 does not receive the information 132 on the abnormal reception of MBMS data within the monitor time window 115, for example, the BS 110 may keep the coverage of the P2MP channel for transmitting the MBMS data (e.g. the MBMS data 131) unchanged.

In another example, in a case where the BS 110 has not received the information 132 on the abnormal reception of MBMS data within the monitor time window 115, as illustrated in FIG. 1, the BS 110 may reduce the coverage of the P2MP channel or the MBMS transmission in an operation 114 for example by reducing the transmission power of the P2MP channel and/or improving the MCS level of the P2MP channel. For example, if no information 132 on abnormal reception of MBMS has been received before an expiration of the timer configured in the BS 110 to provide the monitor time window 115 for the BS 110, the BS 110 may determine that the MBMS 131 has been received successfully or normally by one or more UEs, and may perform the operation 114 to reduce the transmission power of the P2MP channel by a predetermined degree, and/or to increase the MCS level of the P2MP channel by a predetermined number of levels.

Further, as illustrated in FIG. 1, the UE 120 may also transmit information 133 on a normal/successful reception of MBMS data 131 to the BS 110 in case where the UE 120 detects a successful reception of the MBMS data 131 in the operation 122, for example in a case where the UE 120 receives the expected MBMS data 131 within a predetermined time window and decode the received MBMS data 131 successfully.

In an example, the information 133 may include an indication (e.g. a 1-bit indication) on the normal reception of MBMS data 131. In addition or instead, for example, one or more additional information items may be included in the information 133.

For example, the additional information items in the information 133 may include one or more quality detections on the at least one P2MP channel associated with the MBMS, which may be detected or measured for example in a case where the UE 120 detects a successful or normal reception of MBMS data 131 in the operation 122, or during a period when monitoring the MBMS data in the operation 121, or at other suitable timing. For example, the quality detection may include, but is not limited to, one or more of at least one detected SNR on the at least one P2MP channel associated with the MBMS, at least one detected CQI on the at least one P2MP channel associated with the MBMS, at least one detected BLER on the at least one P2MP channel associated with the MBMS, at least one detected PER on the at least one P2MP channel associated with the MBMS, or the like.

For example, the additional information items in the information 133 may also include information for example on at least one ongoing MBMS in a current cell or in a serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. For example, the information 133 may include at least one temporary mobile group identity of at least one ongoing MBMS in the current cell or in the serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. For example, in a case where the UE 120 may detect a successful or normal reception of MBMS data in the operation 122, the UE 120 may add information on the MBMS associated with the MBMS data 131 in at least one correctly received MBMS in the current cell, and the information 132 may include the updated list of the at least one correctly received MBMS in the current cell.

In various examples, the information 133 on the normal reception of MBMS data 131 may be enclosed and transmitted by a RRC signaling, a MAC CE, a physical layer signaling, or the like. For example, in case where the UE 120 is in an idle state (e.g. RRC_IDLE state) or an inactive state (e.g. RRC_INACTIVE state), the UE 120 may request an RRC connection and may enclose the information 133 on the normal reception of MBMS data 131 in the message 3 (or msg3) of an RA procedure or message A (or msgA) of a 2-step RA procedure or the like, through which signaling overhead may be reduced. In another example, a preamble may be configured for the information 133 on the successful/normal reception of MBMS data 131, and the UE 120 may transmit the preamble to the BS 110 when detecting the successful/normal reception of MBMS data 131 in the operation 122.

In an example, in response to receiving the information 133 within the monitor time window 115, the BS 110 may keep the information 133 without adjusting the converge of the MBMS transmission, and may utilize the information 133 later in the operation 114 performed in response to the end of the monitor time window 115. For example, in the operation 114, the BS 110 may determine an adjustment amount for the transmission power and/or MCS level of the P2MP channel associated with one or more correctly received services based on the information 133.

In another example, as illustrated in FIG. 1, in response to receiving the information 133 within the monitor time window 115, the BS 110 may perform an operation 113 to reduce the converge of the MBMS transmission associated with one or more services based on the information 133, for example by reducing transmission power of the P2MP channel or modulation and/or increasing the MCS level of the P2MP channel. For example, in the operation 113, the BS 110 may determine an adjustment amount for the transmission power and/or MCS level of the P2MP channel associated with one or more correctly received services based on the information 133. In this example, in response to the end of the monitor time window 115, the operation 114 may be either performed or ignored.

In another example, the BS 110 may ignore the information 133 from the UE 110. In another example, the BS 110 may perform the operation 114 in response to receiving the information 133 after the end of the monitor time window 115.

In some examples, after adjusting the coverage of the MBMS transmission (e.g. the operation 112, 113, or 114), the MBMS 131 may be retransmitted and the operation 111 of monitoring the information on the reception status of the MBMS 131 from one or more UEs may be re-performed again. For example, the timer configured in the BS 110 for the monitoring may be restarted.

Further, as illustrated in FIG. 1, in some examples, the BS 110 may also transmit information 134 to one or more UEs.

In an example, the information 134 may include one or more configurations of the information 132 on the abnormal reception and/or the information 133 on the normal reception. For example, a configuration on the information 132 and/or 133 may specify the contents (e.g. one or more qualities to be detected) included in the information 132 and/or 133, and different configurations on the information 132 and/or 133 may be associated with different multimedia broadcast multicast services. For example, the information 134 may include a configuration on the information 132 associated with a first MBMS which specifies that the information 132 associated with the first MBMS includes a detected BLER on the P2MP channel associated with the first MBMS, and another configuration on the information 132 associated with a second MBMS which specifies that the information 132 associated with the second MBMS does not include information on quality detection. Based on the information 134, when the UE 120 detects an abnormal reception of MBMS data for the first MBMS, the UE 120 may detect BLER on the P2MP channel associated with the first MBMS, and may include the detected BLER on the P2MP channel associated with the first MBMS in the information 132. When the UE 120 detects an abnormal reception of MBMS data for the second MBMS, the UE 120 may transmit the information 132 indicating an abnormal reception of MBMS data for the second MBMS without quality detections. Thus, the information 132/133 reporting from a UE to the BS 110 may be configured flexibly.

In addition or instead, the information 134 may also include information on the timer in the BS 110 for monitoring the information on the reception status. For example, the UE 120 may configure or determine the time window for the operation 121 of monitoring the MBMS data 131, based on information on the timer in the BS 110. For example, the UE 120 may configure the timer window for monitoring the MBMS data 131 to match the monitor time window 115 for the BS 110, so that the UE 120 may inform the information 132/133 to the BS 110 in time.

In addition or instead, the information 134 may also include information on one or more quality thresholds on the at least one P2MP channel associated with the MBMS, for example a threshold for BLER on the P2MP channel associated with the first MBMS, a threshold for PER on the P2MP channel associated with the first MBMS, a threshold for BLER on the P2MP channel associated with the second MBMS, a threshold for PER on the P2MP channel associated with the second MBMS, and so on. Then, the UE 120 may utilize such one or more quality thresholds to evaluate the reception status of the MBMS data and/or reception quality of the MBMS data. For example, the UE 120 may detect the quality of a P2MP channel associated with an MBMS for example before or during the operation 121, and in case where the detected quality is below the threshold indicated in the information 134, the UE 120 may determine the abnormal reception of MBMS data in the operation 122, for example without an actual reception of the MBMS data 131.

In addition or instead, the information 134 may also include information on one or more of at least one ongoing MBMS in a current cell or in a serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. For example, the information 134 may include at least one TMGI of at least one ongoing MBMS in a current cell or in a serving cell that provides one or more multimedia broadcast multicast services, at least one correctly received MBMS in the current cell or in the serving cell that provides one or more multimedia broadcast multicast services, at least one MBMS of interest in the current cell or in the serving cell that provides one or more multimedia broadcast multicast services, or the like. Then, for example, in a case where the UE 120 detects that the received MBMS data 131 is not associated with a registered TMGI of a MBMS of interest of the UE 120, the UE 120 may determine the abnormal reception of MBMS data in the operation 122.

Figure 2:
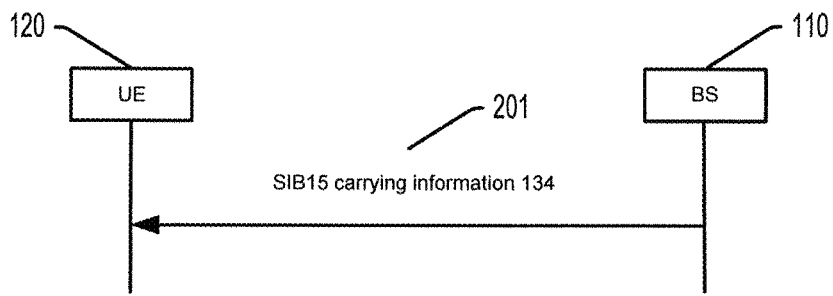
FIG. 2 illustrates an example of information communication in an embodiment.

In various examples, the information 134 may be transmitted via at least one of RRC signaling, system information, a dedicated signaling, or the like. For example, as illustrated in FIG. 2, a system information block 15 (SI15) may be extended to carry the information 134. In another example, a system information block 20 (SI20) may be extended to carry the information 134 in a case of a single cell point to multi-points (SC-PTM) services/transmissions. In another example, other one or more system information blocks (SIBs) or new SIBs may be utilized for transmitting the information 134.

Figure 3:
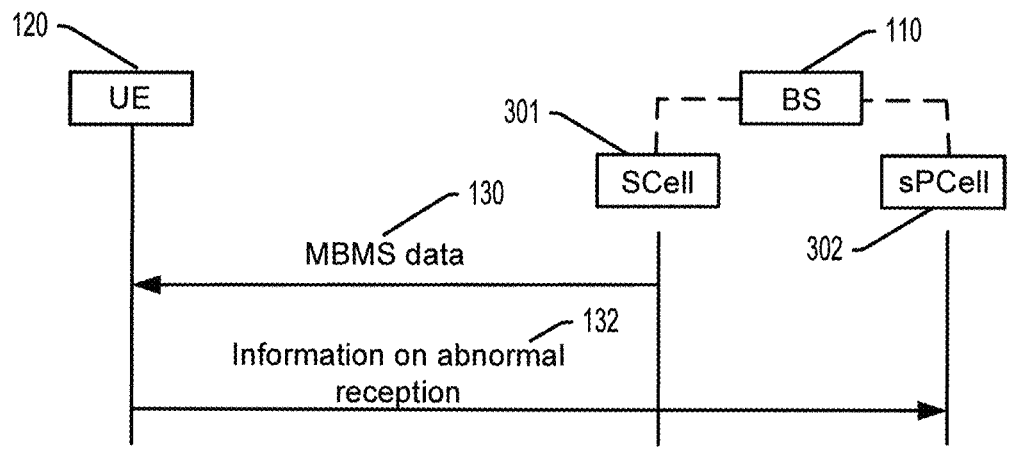
FIG. 3 illustrates an example of information communication in an embodiment.

Further, in some examples, the transmissions of the MBMS data 131 and the information 132/133/134 may be associated with either the substantially same serving cell or different serving cells. For example, as illustrated in FIG. 3, the BS 110 may transmit the MBMS data 131 in a secondary cell (SCell) 301 and receive the information 132 on abnormal reception in a special cell (sPCell) 302. Correspondingly, the UE 120 may receive the MBMS data 131 in the SCell 301 and transmit the information 132 on abnormal reception in the sPCell 302.

Figure 4:
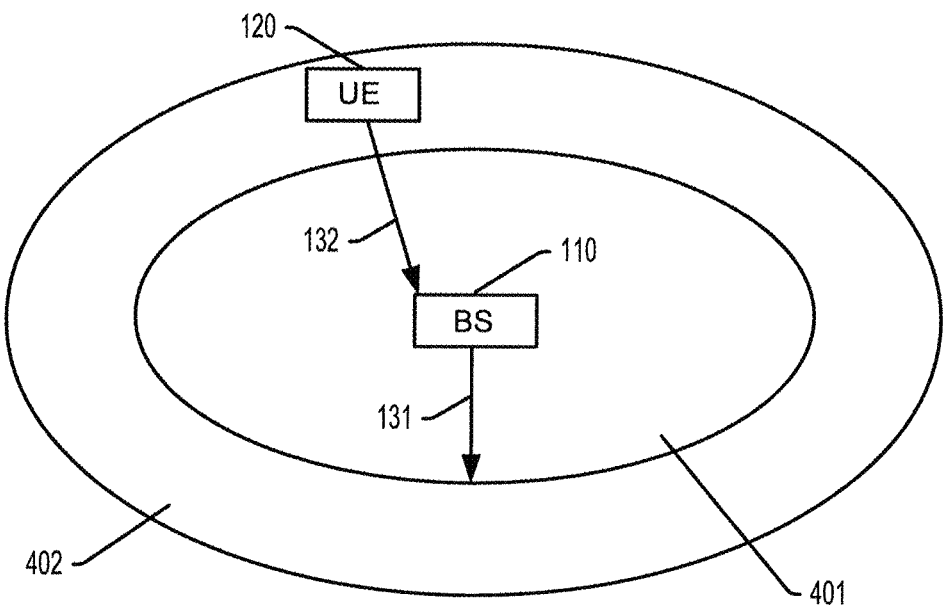
FIG. 4 illustrates an example of adjustment of the coverage of the MBMS transmission in an embodiment.

FIG. 4 illustrates an example of adjustment of the coverage of the MBMS transmission based on the example procedure as illustrated in FIG. 1. In the example as illustrated in FIG. 4, the UE 120 locates outside of a coverage scope 401 of the MBMS transmission within which the BS 110 transmit the MBMS data 131. Then, for example due to not receiving the MBMS data 131 within a predetermined time window, the UE 120 may transmit the information 132 on the abnormal reception of MBMS data to the BS 110. In response to receiving the information 132 on the abnormal reception of MBMS data from the UE 120, the BS 110 may improve the transmission power of the P2MP channel and/or reduce the MCS level of the P2MP channel, so that the coverage scope 401 may be enlarged to a new scope 402 which covers at least the UE 120. Thus, new transmission of the MBMS data 131 may be received by the UE 120.

Figure 5:
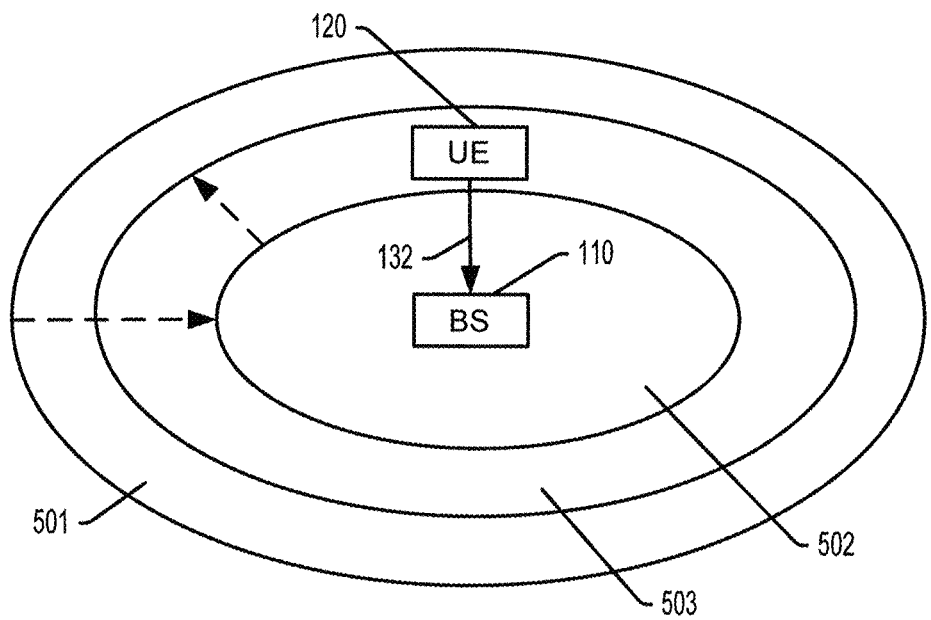
FIG. 5 illustrates another example of adjustment of the coverage of the MBMS transmission in an embodiment.

FIG. 5 illustrates another example of adjustment of the coverage of the MBMS transmission based on the example procedure as illustrated in FIG. 1. In the example as illustrated in FIG. 5, the UE 120 locates within a coverage scope 501 of the MBMS transmission, and may receive the MBMS data 131 from the BS 110 successfully. Then, in a case where the BS 110 does not receive information 132 on abnormal reception of MBMS data for example within the predetermined time window 115, the BS 110 may reduce the transmission power of the P2MP channel and/or improve the MCS level of the P2MP channel in the operation 114 as illustrated in FIG. 1, so that the coverage scope 501 may be reduced to a new scope 502.

Further, as illustrated in FIG. 5, the UE 120 may fall outside of the new scope 502 and thus fail to receive the MBMS data from the BS 110 due to the reduction of the coverage scope in the previous operation 114. Then, a procedure similar to that as illustrated in FIG. 4 may be repeated, where the UE 120 may transmit the information 132 on the abnormal reception of MBMS data to the BS 110 and the BS 110 may perform the operation 112 again to enlarge the coverage of the P2MP channel from the scope 502.

In an example, the coverage of the MBMS transmission may be enlarged in the operation 112 based on the adjustment (reduced amount) in the operation 114, and the scope 502 may be enlarged back to the scope 501.

In another example, the coverage of the MBMS transmission may be enlarged in the operation 112 based on one or more previous adjustments and/or one or more previous coverage scopes. For example, new transmission power and/or new MCS level may be determined based on the transmission powers corresponding to the scopes 501 and 502 and/or the MCS levels corresponding to the scopes 501 and 502, so that the new scope 503 may be between the scopes 501 and 502 and may cover the UE 120.

In another example, the coverage of the MBMS transmission may be enlarged in the operation 112 based on the additional information items in the information 132, such as one or more detected qualities on the P2MP channel associated with the MBMS, so that a finer and more accurate enlargement from the scope 502 to the scope 503 may be achieved.

Figure 6:
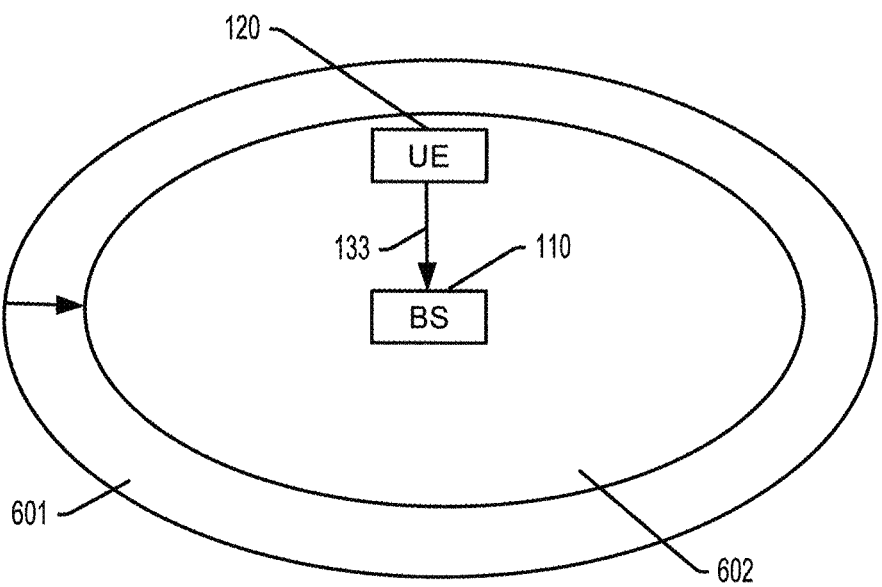
FIG. 6 illustrates another example of adjustment of the coverage of the MBMS transmission in an embodiment.

FIG. 6 illustrates another example of adjustment of the coverage of the MBMS transmission based on the example procedure as illustrated in FIG. 1. In the example as illustrated in FIG. 6, the UE 120 locates within a coverage scope 601 of the MBMS transmission, and may receive the MBMS data 131 from the BS 110 successfully. Then, the UE 120 may transmit the information 133 on the normal/successful reception of the MBMS 131 to the BS 110. For example, the information 133 may include information on one or more detected qualities, a list of correctly received services, or the like. Then, based on the information 133, the BS 110 may perform the operation 113 or 114 to reduce the transmission power of the P2MP channel and/or improve the MCS level of the P2MP channel, so that the coverage scope 601 may be reduced efficiently to a new scope 602 which also covers the UE 120.

In the above one or more examples, through the example procedure for example as illustrated in FIG. 1, for example, the BS or the network may configure or adjust the coverage of the MBMS transmission dynamically based on feedback(s) from one or more UEs, so that the a waste of transmission power may be reduced or avoided.

It is appreciated that the disclosure is not limited to the above examples, and one or more modifications and/or variations may be made based on the above examples.

Figure 7:
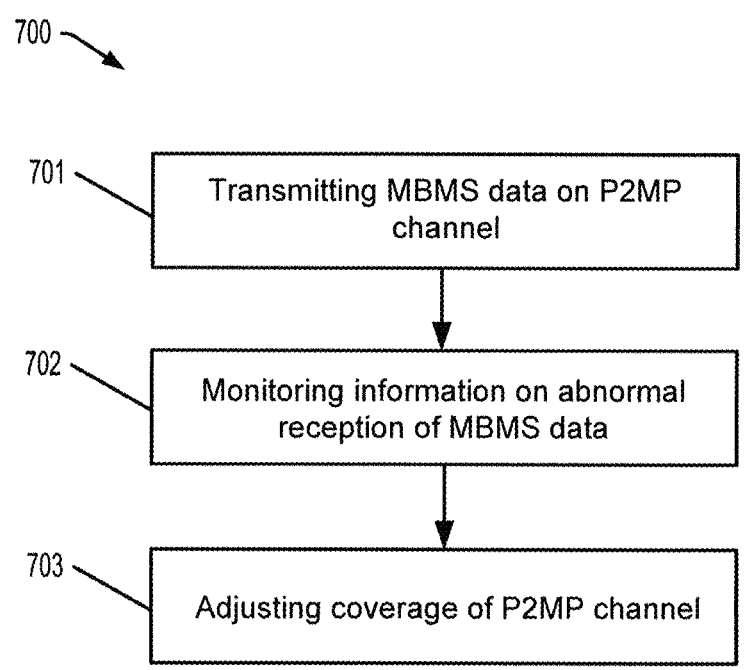
FIG. 7 illustrates an example method for configuring/adjusting dynamically coverage of the MBMS transmission in an embodiment.

FIG. 7 illustrates an example method 700 for configuring/adjusting dynamically coverage of the MBMS transmission in an embodiment, which may be performed for example in the BS 110.

As illustrated in FIG. 7, in an operation 701, the BS 110 may transmit data of an MBMS (e.g. the MBMS data 131) on a P2MP channel. For example, in the operation 701, the data of the MBMS on the P2MP channel may include at least one of a control signaling of the MBMS on the MCCH, service data of the MBMS on the MTCH, or the like. In an operation 702, the BS 110 may monitor an uplink channel for information on an abnormal reception of the data (e.g. the information 132). In an operation 703, the BS 110 may adjust coverage of the P2MP channel based on the monitoring in the operation 702.

Figure 8:
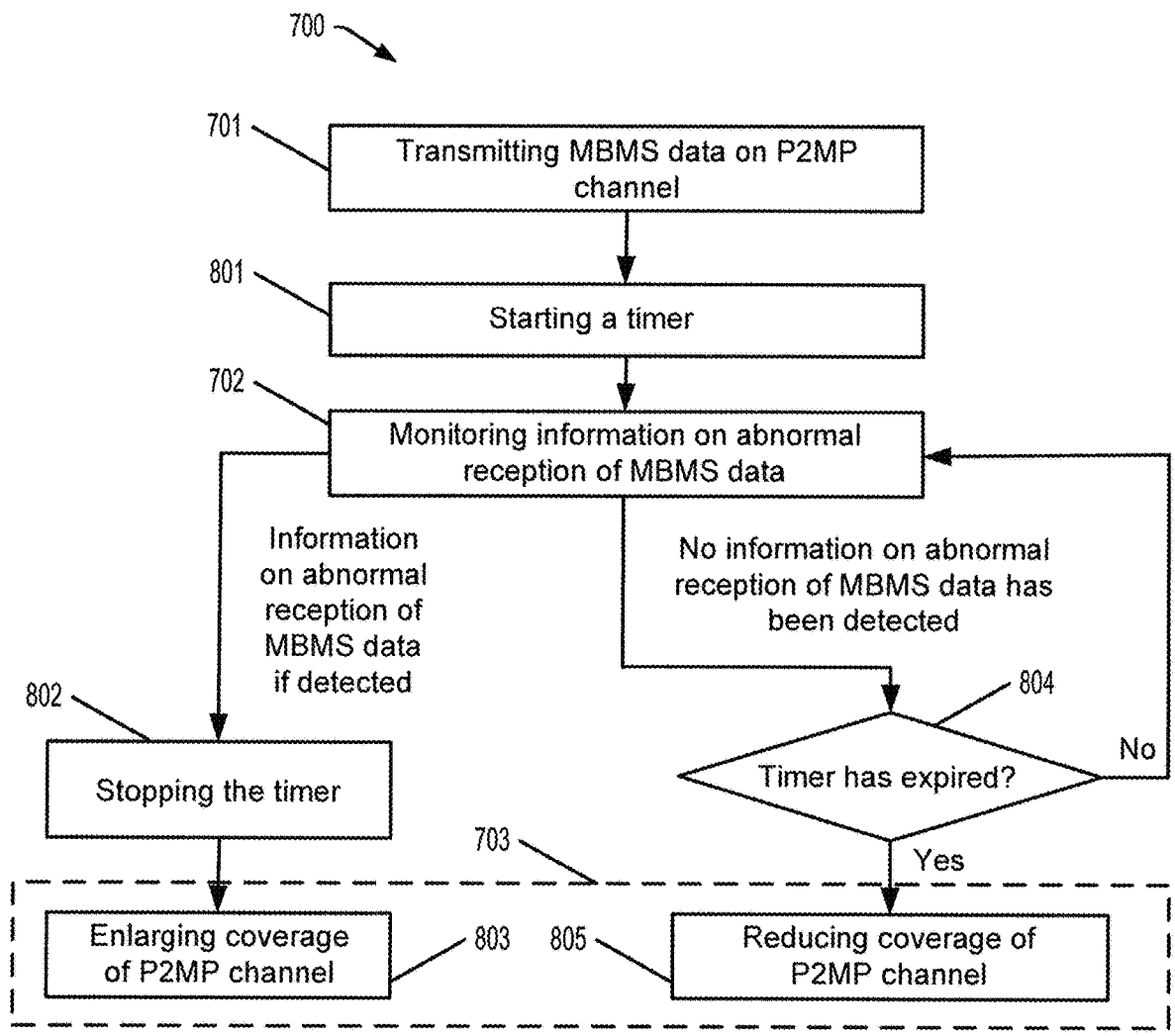
FIG. 8 illustrates an example method for configuring/adjusting dynamically coverage of the MBMS transmission in an embodiment.

In another embodiment, as illustrated in FIG. 8, the example method 700 may further include an operation 801. In the operation 801, the BS 110 may start a timer for the operation 702 (e.g. the timer for providing the monitor time window 115), for example in response to the operation 701. Then, in a case where information on an abnormal reception of MBMS data (e.g. the information 132) is detected based on the operation 702, for example before an expiration of the timer, the BS 110 may perform an operation 802 to stop the timer. Further, in the operation 703, the BS 110 may perform a sub-operation 803 to enlarge the coverage of the P2MP channel, for example based on the information on the abnormal reception of the MBMS data which is detected in the operation 702 before the operation 802.

In addition, also as illustrated in FIG. 8, in the example method 700, the BS 110 may check whether the timer started in the operation 801 has expired, 804 in a case where no information on the abnormal reception of the MBMS data is detected in the operation 702. If the timer has expired, in the operation 703, the BS 110 may perform a sub-operation 805 to reduce the coverage of the P2MP channel. If the timer has not expired, the BS 110 may continue to monitor the information on the abnormal reception of the MBMS data in the operation 702.

For example, the coverage of the P2MP channel may be enlarged by at least one of a reduction of transmission power of the P2MP channel or an improvement of MCS level of the P2MP channel. For example, the coverage of the P2MP channel may be reduced by at least one of an improvement of transmission power of the P2MP channel or a reduction of MCS level of the P2MP channel.

In some embodiments, the information on the abnormal reception, which is monitored or received in the operation 702, may include information on one or more of: an indication of the abnormal reception; at least one quality detection on the P2MP channel associated with the MBMS; at least one ongoing MBMS in the current cell or in the serving cell that provides one or more multimedia broadcast multicast services; at least one correctly received MBMS in the current cell or in the serving cell that provides one or more multimedia broadcast multicast services; at least one MBMS of interest in the current cell or in the serving cell that provides one or more multimedia broadcast multicast services; or the like. For example, the at least one quality detection on the P2MP channel associated with the MBMS may include one or more of: a detected SNR on the P2MP channel associated with the MBMS; detected CQI on the P2MP channel associated with the MBMS; a detected BLER on the P2MP channel associated with the MBMS; a detected PER on the P2MP channel associated with the MBMS; or the like.

In some embodiments, the information on the abnormal reception, which is monitored in the operation 702, may be received via one or more of RRC signaling, a MAC CE, a physical signaling, a preamble, or the like.

Figure 9:
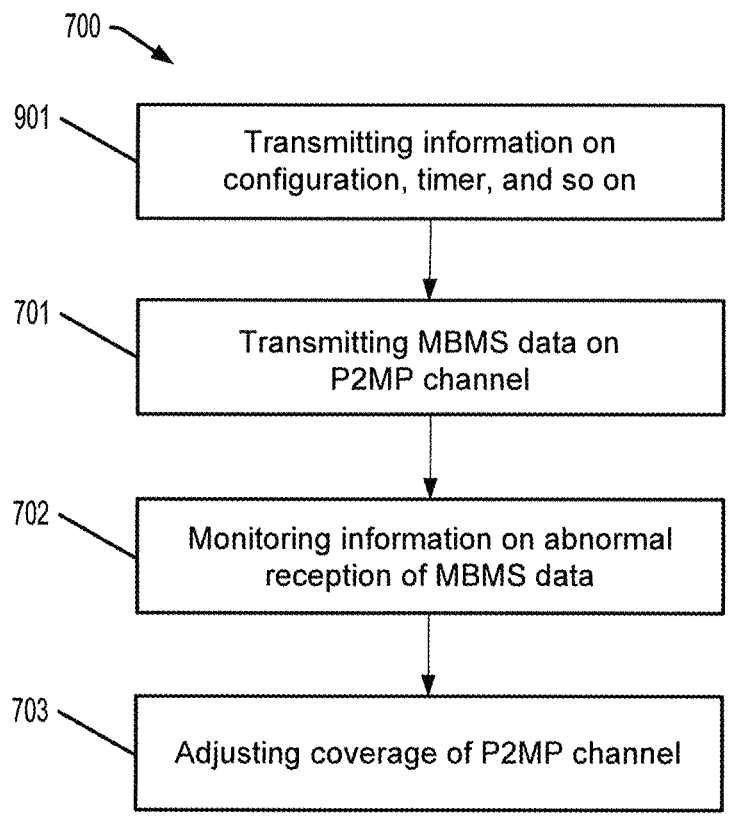
FIG. 9 illustrates an example method for configuring/adjusting dynamically coverage of the MBMS transmission in an embodiment.

Further, as illustrated in FIG. 9, in some embodiments, the example method 700 may also include an operation 901 of transmitting information (e.g. the information 134) on at least one of a configuration of the information on the abnormal reception, information on a timer for monitoring the information on the abnormal reception, at least one ongoing MBMS in a current cell or in a serving cell that provides one or more multimedia broadcast multicast services, at least one quality threshold on the P2MP channel associated with the MBMS, or the like. For example, such information transmitted in the operation 901 may be via at least one of RRC signaling, system information (e.g. SI15, SI20), a dedicated signaling, or the like. For example, different configuration of the information on the abnormal reception may be associated with different multimedia broadcast multicast services.

In some embodiments, the transmission of the data of the MBMS in the operation 701 and a reception of the information on the abnormal reception in the operation 702 may be associated with different serving cells. For example, the transmission of the data of the MBMS in the operation 701 may be associated with a secondary cell, and the reception of the information on the abnormal reception in the operation 702 may be associated with a special cell. Further, the transmission of the data of the MBMS in the operation 701, the transmission in the operation 901, and a reception of the information on the abnormal reception in the operation 702 may be associated with different serving cells.

Figure 10:
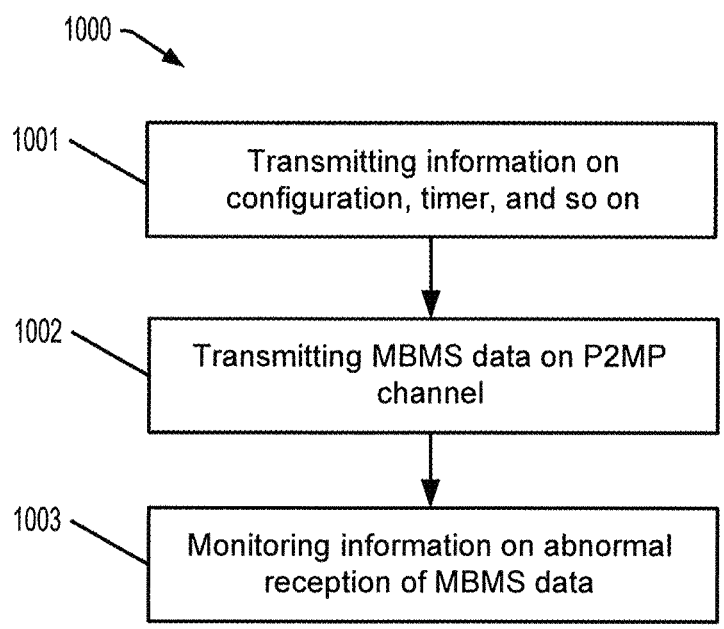
FIG. 10 illustrates an example method for configuring/adjusting dynamically coverage of the MBMS transmission in an embodiment.

Cooperating with the example method 700 in the BS 110, FIG. 10 illustrates an example method 1000 for configuring/ adjusting dynamically coverage of the MBMS transmission in an embodiment, which may be performed for example in the UE 120.

As illustrated in FIG. 10, in the operation 1001, the UE 120 may monitor data of an MBMS (e.g. the MBMS data 131) on a P2MP channel. Then, in an operation 1002, the UE 120 may detect an abnormal reception of the data. For example, in a case of a reception failure of the data on the P2MP channel within a predetermined time window, or in a case of a decoding error of the data received via the P2MP channel, or the like, the UE 120 may detect the abnormal reception of the data of the MBMS. Then, in an operation 1003, the UE 120 may transmit information on the abnormal reception (e.g. the information 132) in response to the detection in the operation 1002.

In some embodiments, the information on the abnormal reception, which is transmitted in the operation 1003, may include information on one or more of: an indication of the abnormal reception; at least one quality detection on the P2MP channel associated with the MBMS; at least one ongoing MBMS in the current cell or in the serving cell that provides one or more multimedia broadcast multicast services; at least one correctly received MBMS in the current cell or in the serving cell that provides one or more multimedia broadcast multicast services; at least one MBMS of interest in the current cell or in the serving cell that provides one or more multimedia broadcast multicast services; or the like. For example, the at least one quality detection on the P2MP channel associated with the MBMS may include one or more of: a detected SNR on the P2MP channel associated with the MBMS; detected CQI on the P2MP channel associated with the MBMS; a detected BLER on the P2MP channel associated with the MBMS; a detected PER on the P2MP channel associated with the MBMS; or the like. For example, the information on the abnormal reception may be transmitted via one or more of RRC signaling, a MAC CE, a physical signaling, a preamble, or the like.

Figure 11:
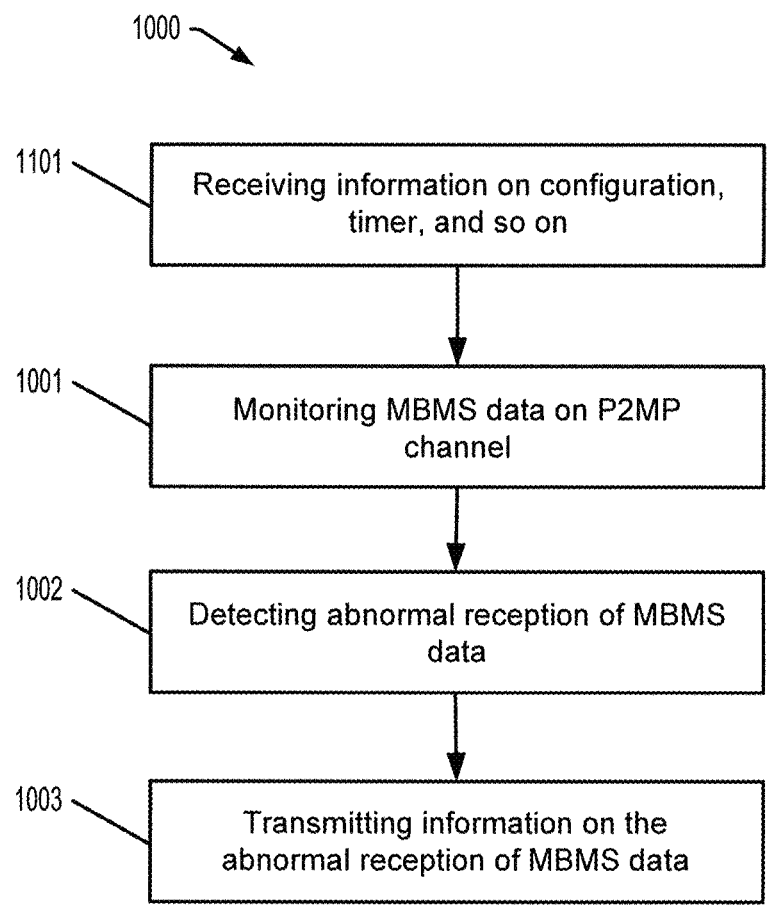
FIG. 11 illustrates an example method for configuring/adjusting dynamically coverage of the MBMS transmission in an embodiment.

Further, as illustrated in FIG. 11, in some embodiments, the example method 1000 may also include an operation 1101 of receiving information (e.g. the information 134) on at least one of a configuration of the information on the abnormal reception, information on a timer for monitoring the information on the abnormal reception, at least one ongoing MBMS in a current cell or in a serving cell that provides one or more multimedia broadcast multicast services, at least one quality threshold on the P2MP channel associated with the MBMS, or the like. For example, such information received in the operation 1101 may be via at least one of RRC signaling, system information (e.g. SI15, SI20), a dedicated signaling, or the like. For example, different configuration of the information on the abnormal reception may be associated with different multimedia broadcast multicast services.

In some embodiments, a reception of the data of the MBMS in the operation 1001 and the transmission of the information on the abnormal reception in the operation 1003 may be associated with different serving cells. For example, the transmission of the data of the MBMS in the operation 701 may be associated with a special cell, and the reception of the information on the abnormal reception in the operation 702 may be associated with a secondary cell. Further, a reception of the data of the MBMS in the operation 1001, the reception in the operation 1101, and the transmission of the information on the abnormal reception in the operation 1003 may be associated with different serving cells.

Figure 12:
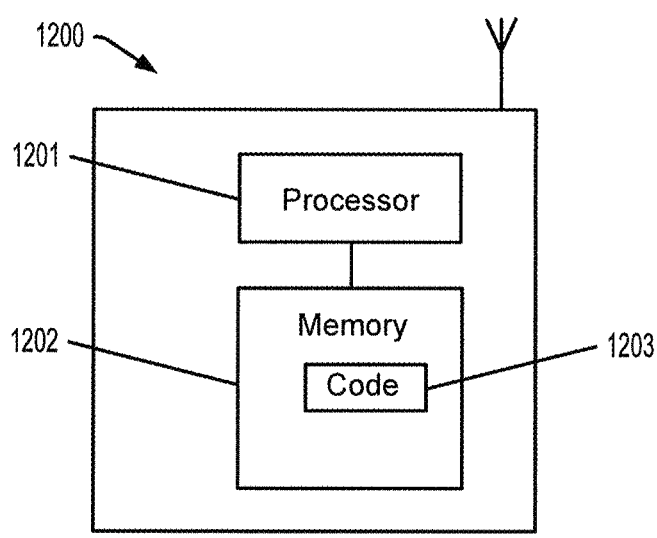
FIG. 12 illustrates an example apparatus for configuring/adjusting dynamically coverage of the MBMS transmission in an embodiment.

FIG. 12 illustrates an example apparatus 1200 for configuring/adjusting dynamically coverage of the MBMS transmission in an embodiment, which may be for example at least a part of the BS 110.

As shown in FIG. 12, the example apparatus 1200 may include at least one processor 1201 and at least one memory 1202 that may include computer program code 1203. The at least one memory 1202 and the computer program code 1203 may be configured to, with the at least one processor 1201, cause the apparatus 1200 at least to perform at least the operations of the example method 700 described above.

In various embodiments, the at least one processor 1201 in the example apparatus 1200 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1201 may also include at least one other circuitry or element not shown in FIG. 12.

In various embodiments, the at least one memory 1202 in the example apparatus 1200 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1202 may include, but are not limited to, an electric, a magnetic, an optical, an electromagnetic, an infrared, or a semiconductor system, apparatus, or device or any combination of the above.

Further, in various embodiments, the example apparatus 1200 may also include at least one other circuitry, element, and interface, for example at least one I/O interface, at least one antenna element, and the like.

In various embodiments, the circuitries, parts, elements, and interfaces in the example apparatus 1200, including the at least one processor 1201 and the at least one memory 1202, may be coupled together via any suitable connections including, but not limited to, buses, crossbars, wiring and/or wireless lines, in any suitable ways, for example electrically, magnetically, optically, electromagnetically, and the like.

Figure 13:
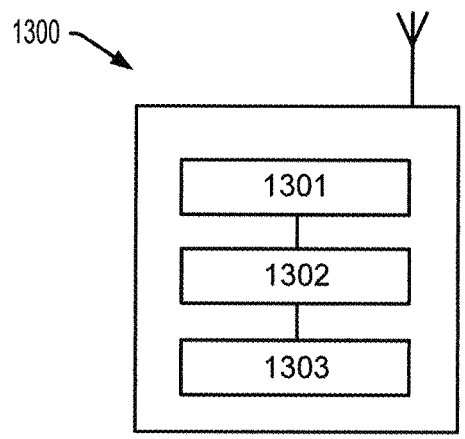
FIG. 13 illustrates an example apparatus for configuring/adjusting dynamically coverage of the MBMS transmission in an embodiment.

FIG. 13 illustrates an example apparatus 1300 for configuring/adjusting dynamically coverage of the MBMS transmission in an embodiment, which may be for example at least a part of the BS 110.

As shown in FIG. 13, the example apparatus 1300 may include means for performing operations of the example method 700 described above in various embodiments. For example, the apparatus 1300 may include means 1301 for performing the operation 701 of the example method 700, means 1302 for performing the operation 702 of the example method 700, and means 1303 for performing the operation 703 of the example method 700. In one or more another embodiment, at least one I/O interface, at least one antenna element, and the like may also be included in the example apparatus 1300. In one or more another embodiments, the example apparatus 1300 may further include one or more means for performing one or more additional operations in the example method 700, such as one or more means for performing the operations 801, 802, 803, 804, 805, and 901 of the example method 700.

In some embodiments, examples of means in the apparatus 1300 may include circuitries. For example, an example of means 1301 may include a circuitry configured to perform the operation 701 of the example method 700, an example of means 1302 may include a circuitry configured to perform the operation 702 of the example method 700, and an example of means 1303 may include a circuitry configured to perform the operation 703 of the example method 700. In some embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 14:
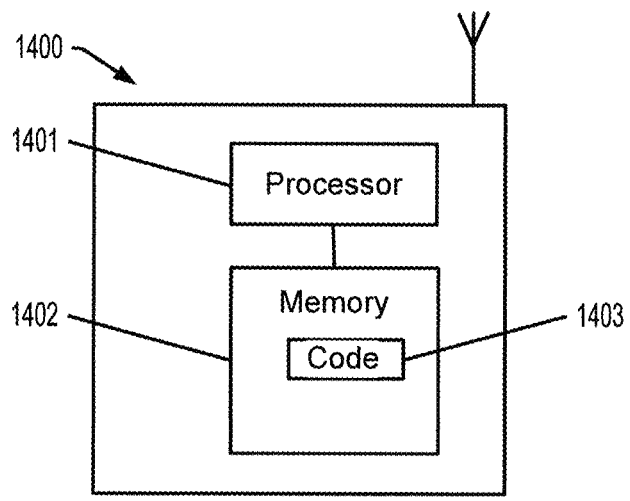
FIG. 14 illustrates an example apparatus for configuring/adjusting dynamically coverage of the MBMS transmission in an embodiment.

FIG. 14 illustrates an example apparatus 1400 for configuring/adjusting dynamically coverage of the MBMS transmission in an embodiment, which may be for example at least a part of the UE 120.

As shown in FIG. 14, the example apparatus 1400 may include at least one processor 1401 and at least one memory 1402 that may include computer program code 1403. The at least one memory 1402 and the computer program code 1403 may be configured to, with the at least one processor 1401, cause the apparatus 1400 at least to perform at least the operations of the example method 1000 described above.

In various embodiments, the at least one processor 1401 in the example apparatus 1400 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1401 may also include at least one other circuitry or element not shown in FIG. 14.

In various embodiments, the at least one memory 1402 in the example apparatus 1400 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1402 may include, but are not limited to, an electric, a magnetic, an optical, an electromagnetic, an infrared, or a semiconductor system, apparatus, or device or any combination of the above.

Further, in various embodiments, the example apparatus 1400 may also include at least one other circuitry, element, and interface, for example at least one I/O interface, at least one antenna element, and the like.

In various embodiments, the circuitries, parts, elements, and interfaces in the example apparatus 1400, including the at least one processor 1401 and the at least one memory 1402, may be coupled together via any suitable connections including, but not limited to, buses, crossbars, wiring and/or wireless lines, in any suitable ways, for example electrically, magnetically, optically, electromagnetically, and the like.

Figure 15:
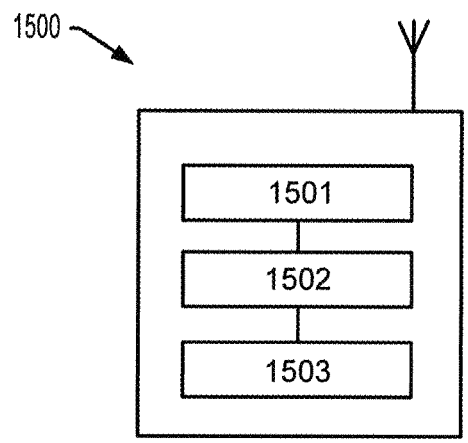
FIG. 15 illustrates an example apparatus for configuring/adjusting dynamically coverage of the MBMS transmission in an embodiment.

FIG. 15 illustrates an example apparatus 1500 for configuring/adjusting dynamically coverage of the MBMS transmission in an embodiment, which may be for example at least a part of the UE 120.

As shown in FIG. 15, the example apparatus 1500 may include means for performing operations of the example method 1000 described above in various embodiments. For example, the apparatus 1500 may include means 1301 for performing the operation 1001 of the example method 1000, means 1502 for performing the operation 1002 of the example method 1000, and means 1503 for performing the operation 1003 of the example method 1000. In one or more another embodiment, at least one I/O interface, at least one antenna element, and the like may also be included in the example apparatus 1500. In one or more another embodiments, the example apparatus 1500 may further include one or more means for performing one or more additional operations in the example method 1000, such as one or more means for performing the operation 1101 of the example method 1000.

In some embodiments, examples of means in the apparatus 1500 may include circuitries. For example, an example of means 1501 may include a circuitry configured to perform the operation 1001 of the example method 1000, an example of means 1502 may include a circuitry configured to perform the operation 1002 of the example method 1000, and an example of means 1503 may include a circuitry configured to perform the operation 1003 of the example method 1000. In some embodiments, examples of means may also include software modules and any other suitable function entities.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above,"

"below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

What is claimed is:

1. A method comprising:
   receiving first information on a timer for transmitting second information on an abnormal reception and on at least one quality threshold on a point-to-multipoint channel associated with a multimedia broadcast service;
   monitoring, based on a time window matching a monitor time window provided by the timer and based on the at least one quality threshold in the first information, the point-to-multipoint channel for data of a multimedia broadcast multicast service;
   detecting the abnormal reception of the data; and
   transmitting the second information on the abnormal reception in response to the detection,
   wherein the first information further comprises:
   a configuration of the second information on the abnormal reception and at least one ongoing multimedia broadcast multicast service in a current cell or in a serving cell that provides one or more multimedia broadcast multicast services, and the first information is received via radio resource control signaling, system information, and a dedicated signaling,
   wherein the configuration of the information on the abnormal reception is associated with the multimedia broadcast multicast service,
   wherein the abnormal reception of the data comprises a reception failure of the data on the point-to-multipoint channel within a predetermined time window, and a decoding error of the data received via the point-to-multipoint channel,
   wherein the information on the abnormal reception comprises information on: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or the serving cell, and at least one multimedia broadcast multicast service of interest in the current cell or the serving cell,
   wherein the at least one quality detection on the point-to-multipoint channel associated with the multimedia broadcast multicast service comprises: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, and a detected package error rate on the point-to-multipoint channel associated with the multimedia broadcast multicast service,
   wherein the information on the abnormal reception is transmitted via a radio resource control signaling, a media access control element, a physical layer signaling, and a preamble,
   wherein the data of the multimedia broadcast multicast service via the point-to-multipoint channel comprises a control signaling of the multimedia broadcast multicast service via a multicast control channel and service data of the multimedia broadcast multicast service via a multicast traffic channel,
   wherein a reception of the data of the multimedia broadcast multicast service and the transmission of the information on the abnormal reception are associated with different serving cells.

2. An apparatus comprising:
   at least one processor; and
   at least one memory including computer program code, the at least one memory and the computer program code being configured to, with the at least one processor, cause the apparatus to perform:
   receiving first information on a timer for transmitting second information on an abnormal reception and on at least one quality threshold on a point-to-multipoint channel associated with a multimedia broadcast service,
   monitoring, based on a time window matching a monitor time window provided by the timer and based on the at least one quality threshold in the first information, a point-to-multipoint channel for data of a multimedia broadcast multicast service,
   detecting the abnormal reception of the data, and
   transmitting the second information on the abnormal reception in response to the detection, wherein the first information further comprises: a configuration of the second information on the abnormal reception and at least one ongoing multimedia broadcast multicast service in a current cell or in a serving cell that provides one or more multimedia broadcast multicast services, and the first information is received via a radio resource control signaling, system information, or and a dedicated signaling, wherein the configuration of the information on the abnormal reception is associated with the multimedia broadcast multicast service, wherein the abnormal reception of the data comprises a reception failure of the data on the point-to-multipoint channel within a predetermined time window, and a decoding error of the data received via the point-to-multipoint channel, wherein the information on the abnormal reception comprises information on: an indication on the abnormal reception, at least one quality detection on the point-to-multipoint channel associated with the multimedia broadcast multicast service, at least one ongoing multimedia broadcast multicast service in a current cell or in a serving cell that provides one or more multimedia broadcast multicast services, at least one correctly received multimedia broadcast multicast service in the current cell or the serving cell, and at least one multimedia broadcast multicast service of interest in the current cell or the serving cell, wherein the at least one quality detection on the point-to-multipoint channel associated with the multimedia broadcast multicast service comprises: a detected signal and noise rate on the point-to-multipoint channel associated with the multimedia broadcast multicast service, detected channel quality information on the point-to-multipoint channel associated with the multimedia broadcast multicast service, a detected block error rate on the point-to-multipoint channel associated with the multimedia broadcast multicast service, and a detected package error rate on the point-to-multipoint channel associated with the multimedia broadcast multicast service, wherein the information on the abnormal reception is transmitted via a radio resource control signaling, a media access control element, a physical layer signaling, and a preamble, wherein the data of the multimedia broadcast multicast service via the point-to-multipoint channel comprises a control signaling of the multimedia broadcast multicast service via a multicast control channel and service data of the multimedia broadcast multicast service via a multicast traffic channel, wherein a reception of the data of the multimedia broadcast multicast service and the transmission of the information on the abnormal reception are associated with different serving cells.

* * * * *